United States Patent [19]

Lawrence

[11] Patent Number: 4,784,545
[45] Date of Patent: Nov. 15, 1988

[54] DUAL LOAD TRAILER

[76] Inventor: Dennis G. Lawrence, P.O. Box 203, Sweet, Id. 83670

[21] Appl. No.: 42,950

[22] Filed: Apr. 27, 1987

[51] Int. Cl.[4] .............................................. B60P 3/08
[52] U.S. Cl. ...................................... 410/26; 414/482; 280/491 R
[58] Field of Search ........................ 410/26, 29, 29.1; 296/1 A; 280/491 R, 491 B, 414.1; 414/481, 482, 483, 485, 486

[56] References Cited

U.S. PATENT DOCUMENTS

| | | | |
|---|---|---|---|
| 4,068,772 | 1/1978 | Prudhomme | 214/505 |
| 4,221,420 | 9/1980 | Vencill et al. | 296/1 A |
| 4,406,477 | 9/1983 | McDonald | 280/414.1 |
| 4,469,346 | 9/1984 | Low | 280/414.1 |
| 4,560,316 | 12/1985 | Daniels | 414/481 |
| 4,589,814 | 5/1986 | Cates | 414/484 |
| 4,597,585 | 7/1986 | Littlejohn | 280/411 C |

Primary Examiner—Henry A. Bennet
Attorney, Agent, or Firm—Frank J. Dykas

[57] ABSTRACT

A dual load trailer having upper and lower decks pivotally attached to each other by pivot arms, which are biased by means of torsion bar assemblies to apply a downward force upon the upper deck when the upper deck is in a fully raised position, and an upward force when the upper deck is in a fully lowered position. A slideable wheel carriage assembly is provided to facilitate tongue weight adjustment and access to the doors of vehicles transported on the lower deck.

8 Claims, 8 Drawing Sheets

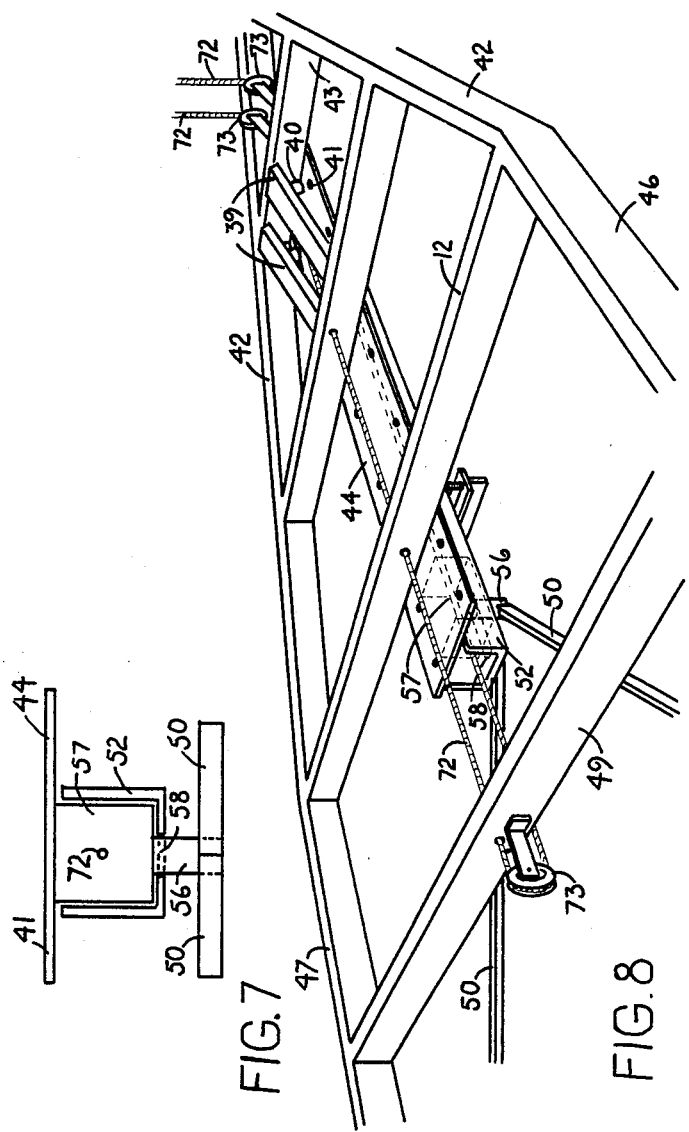

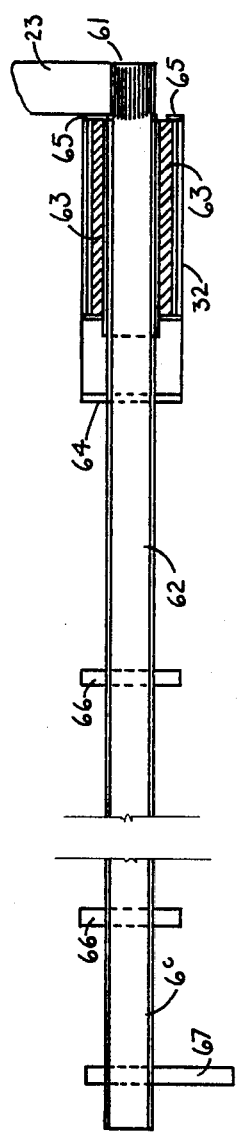
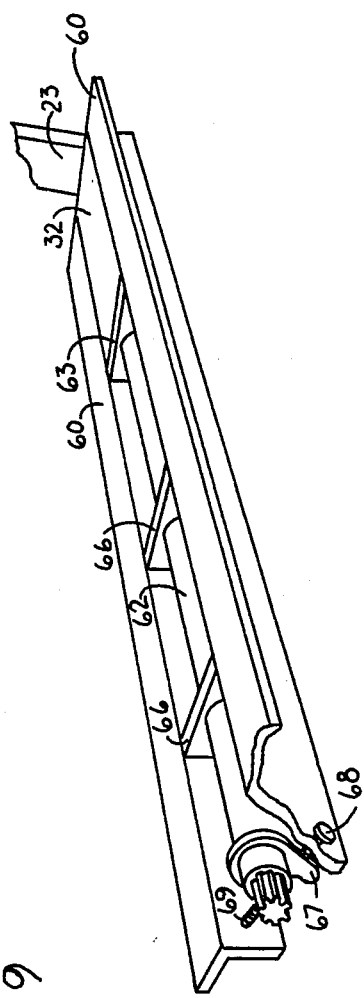
FIG. 9
FIG. 10

DUAL LOAD TRAILER

BACKGROUND OF THE INVENTION

1. Field of Invention

This invention relates to dual load highway trailers, and more particularly to trailers having an upper deck which is lowerable to allow easy loading from ground level, movable axles to facilitate loading, and biasing means to facilitate movement of the upper deck.

2. Description of the Prior Art

The prior art discloses a variety of highway trailers intended to be pulled behind a motor vehicle and adapted to transport two or more loads on two decks, arranged vertically, end-to-end, and otherwise. Various means are employed to facilitate loading and unloading.

U.S. Pat. No. 4,068,772 discloses a double deck trailer in which the upper deck is collapsible on pivoted legs to facilitate loading. The rearmost pair of pivoted legs in this disclosure is slanted outward to bias the upper deck toward collapse.

U.S. Pat. No. 4,221,420 discloses a double deck trailer especially adapted to hauling a car on the lower deck and a boat on the upper deck. The upper deck is moved up and down by a pair of scissors arms located on either side of the load platforms. In this disclosure, a hydraulic ram actuates the scissors arms.

U.S. Pat. No. 4,406,477 discloses a double deck highway trailer especially adapted to transporting a car on the lower platform and a boat on the upper platform. The upper platform is lowered vertically by pulley cables on vertical, rigid stanchions.

U.S. Pat. No. 4,469,346 discloses a double deck highway trailer assembled by attaching together two independent trailers in piggyback fashion. The upper trailer is supported by pivoted arms and is raised into position by a winch. In this disclosure the rear pivoted arms are slanted rearward to facilitate collapse.

U.S. Pat. No. 4,560,316 discloses a trailer especially adapted for simultaneously carrying a motor vehicle and a boat. The boat is carried in a horizontal position. A wheel carriage assembly allows movement of the road wheels in the longitudinal direction to facilitate balancing and loading of the trailer.

U.S. Pat. No. 4,589,814 discloses a double deck highway trailer especially adapted to carry a motor vehicle on the first deck and a boat on the second deck. The upper deck is supported on four pivoted arms which allow the upper deck to be lowered. Additionally, the upper and lower decks together can by pivoted about a transverse axis of the main frame to allow both decks to come to ground level.

U.S. Pat. No. 4,597,585 discloses a tandem trailer assembly of telescoped design to achieve a reduced overall vehicle length.

The principal limitation of the prior art is that none of the inventions disclosed provide positive means for biasing the pivoting arms supporting the upper load surfaces both toward collapse when in the fully extended position and toward extension when in the fully collapsed position. Additionally, none combines the collapsible double decker design with means for longitudinally moving the road wheels. Accordingly, it is the object of this invention to provide a double deck highway trailer with upper platform movable to a lowered position with pivoted arms which are biased both toward extension when lowered and toward collapse when in a raised position.

A second object is to provide a means for longitudinally repositioning the road wheels to facilitate loading and load balancing.

SUMMARY OF INVENTION

These objects are accomplished by the use of a dual load trailer which is assembled from a number of subassemblies, each for a specific purpose in accomplishing these objects. A lower perimeter frame is provided to form a lower deck to which a number of various load carrying platforms can be attached, which include auto rails, expanded metal decking or motorcycle tire tracks. Attached to the lower perimeter frame is a movable wheel carriage assembly which is longitudinally translatable upon said lower frame by means of a traveling block and cable assembly. An upper deck frame assembly is supported by polarity of pivot arms. Selected pivot arm hinges are connected to torsion bar assemblies specially adapted to bias the pivot arms toward collapse when fully extended and toward raising the upper deck when fully lowered.

A cable winch is used to translate the upper frame, on its pivot arms, from the lowered position to the fully raised position. As with the lower perimeter frame, the upper perimeter frame assembly is adapted to accept accessories to enable the transport of a variety of loads including recreational vehicles, motorcycles, and boats.

The lower perimeter frame assembly is of an underslung design in order to lower the center of gravity of the trailer and to facilitate easy loading to the fullest possible extent. Two perimeter side rails and cross members form the lower perimeter frame assembly to which is attached a standard trailer tongue and hitch.

A wheel carriage assembly is slidably mounted to the outer perimeter side rails of the lower perimeter frame and provides for a set of two tandem axles and wheel assemblies. Attached to the forward end of the wheel carriage assembly is an independently slung wheel carriage yoke assembly which ends in a traveling block attached to an endless cable, it rides in a traveling block support cradle. The endless cable is positioned by use of pulleys to enable a winch operator to pull the traveling block forward or back as necessary to adjust the position of the wheel carriage assembly. By adjustment of the wheel carriage assembly the operator is able to: adjust the tongue weight of a fully loaded trailer; move the wheel carriage assembly out of the way so that it will not interfere with the opening and closing of vehicle doors on any vehicle being towed on the lower deck; and finally to extend, rearwardly, the wheels to a fully rearward position in order to stabilize the dual load trailer during the unloading process.

The upper perimeter frame assembly is designed to provide universal support and to readily facilitate the adaptation of the dual load trailer to a variety of applications with regard to what type of loads are carried on the upper deck. It is designed to readily adapt for clamped mounting of boat trailer assemblies or to provide decking for snowmobiles or other recreational vehicles, and finally for motorcycle rails for the transport of a plurality of motorcycles.

The raising and lowering of the upper deck is accomplished by the use of a power winch and cable attached to a latching arm. With the deck in the fully raised position, the latching arm positively engages and locks to a latching rail, thus firmly fixing the upper deck in the raised position. With the latch arm disengaged, the upper deck can be lowered to a load and unloading position.

A positive automatic biasing towards collapse of the upper deck is provided by means of torsion bar assemblies affixed to any of the hinge points of the pivot arms. The torsion bars are splined to the pivot arms and function as a load-bearing and transfer means by the use of teflon bearing assemblies inserted into bearing support tubes which are fully attached to the deck frame. The torsion bar is free wheeling through a limited arc of intermediate travel during the raising and lowering operation. When the upper deck is being raised to a fully upright position, a pawl splined to the opposite end of the torsion bar engages a permanent stop, and thus initiating a torsional rotation of the torsion bar to bias the upper deck toward collapse when unlatched for purposes of lowering it again. An adjustable stop is provided at the opposite end of the arc of travel of the torsion bar for engagement with the pawl to initiate torsional rotation of the torsion bar for biasing the lowered deck toward an upward motion at the initiation of the raising of the lowered deck.

Solenoid operated latch means are provided for engagement with the rear pivot arms when the upper deck is in a fully lowered position to hold the fully lowered upper deck in position against the upward biasing of the torsion bar assemblies.

BRIEF DESCRIPTION OF THE DRAWINGS

FIG. 7 is a representational end view of the traveling block assembly.

FIG. 8 is a representational perspective view of the wheel carriage yoke and traveling block assembly.

FIG. 9 is a representational side view of the torsion bar assembly.

FIG. 10 is a representational perspective view of the pawl and stop biasing means for the torsion bar assembly.

DETAILED DESCRIPTION OF PREFERRED EMBODIMENT

Figure 1:
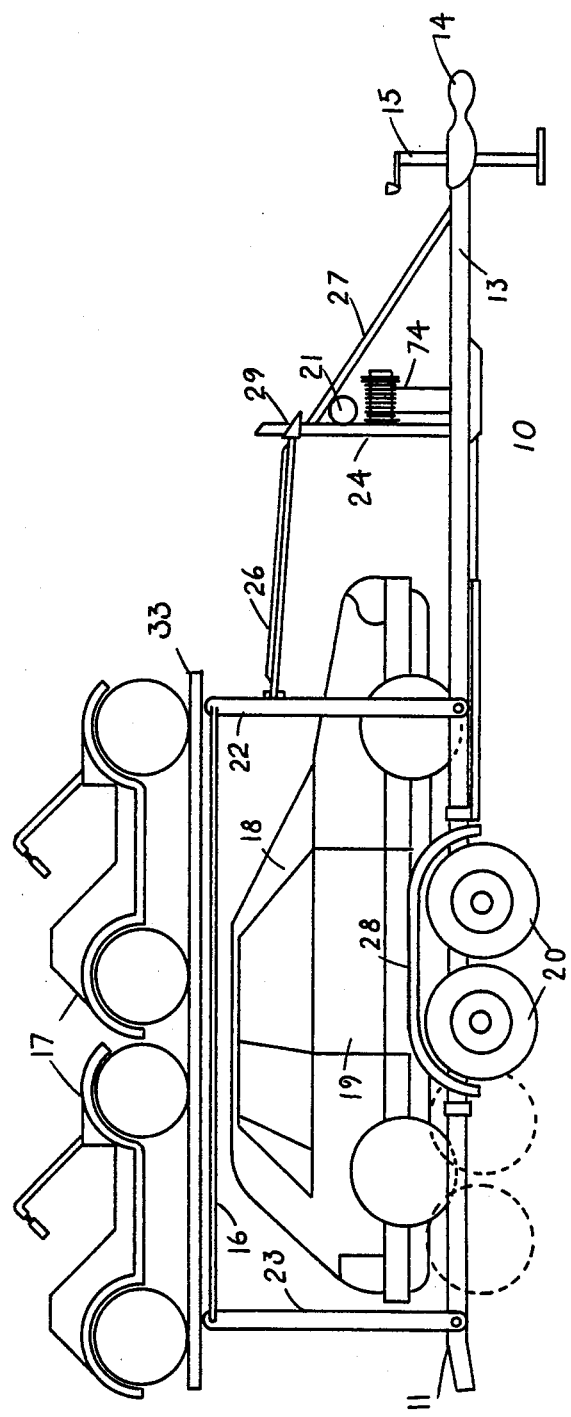
FIG. 1 is a representational side view of my dual load trailer with the upper deck in a fully raised and latched position.

In the preferred embodiment of my dual load trailer 10 as shown in FIG. 1, the various subassemblies of dual load trailer 10 are shown to advantage. These subassemblies can be generally identified as lower perimeter frame assembly 11, tongue frame assembly 13 and upper perimeter frame assembly 16. Referring to FIGS. 1, 2, 3, and 4, it can be seen that my dual load trailer 10 is fabricated of these various subassemblies in order to facilitate the adaptation of the dual load trailer to a number of varied uses. As is seen in FIGS. 1 and 3, the lower perimeter frame assembly 11 has attached to it auto tire rails 54 for use in transporting automobile 18. As is also shown in FIG. 1, upper cargo deck 33 is provided for transportation of recreational vehicles 17.

Figure 2:
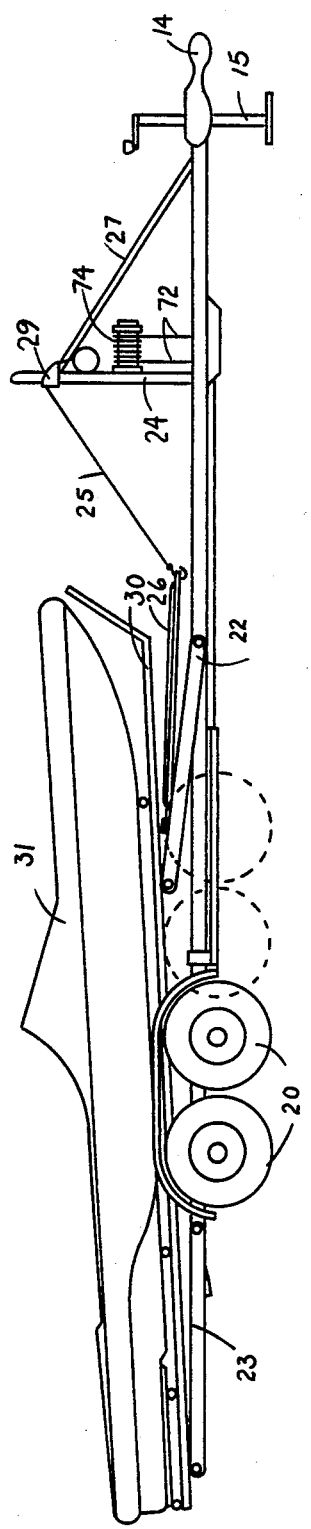
FIG. 2 is a representational side view of my dual load trailer with the upper deck in a lowered position.
Figure 3:
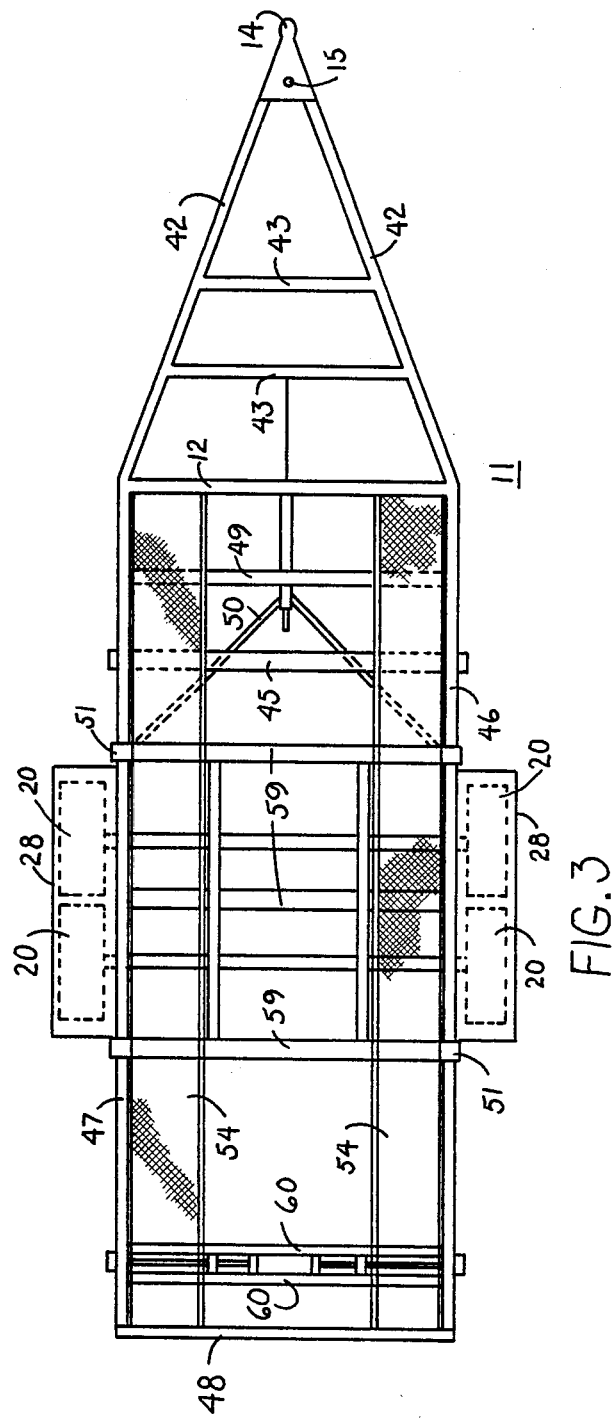
FIG. 3 is a representational top plan view of the lower perimeter frame assembly.
Figure 4:
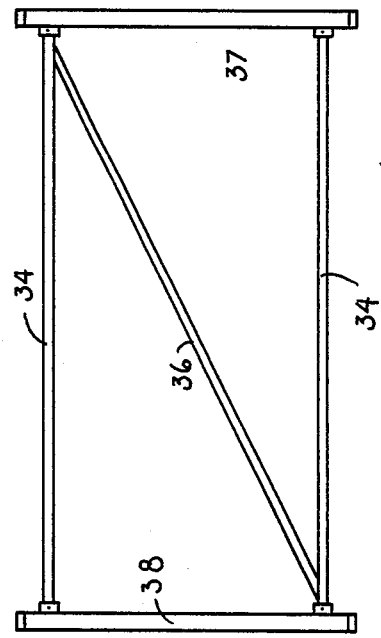
FIG. 4 is a representational top plan view of the upper frame assembly.

Referring to FIGS. 1 and 4, it can be seen that the upper perimeter frame is designed to provide universal support and facilitate the adaptation of the dual load trailer 10 to a variety of applications as is shown in FIG. 2 wherein a boat trailer 30 has been attached to upper perimeter frame 16 for purposes of transporting boat 31. Upper perimeter frame 16 is simply constructed of upper deck side rails 34 and diagonal cross member 36. This frame subassembly is then subsequently attached to front upper deck support rail 37 and rear upper deck support rail 38.

Figure 6:
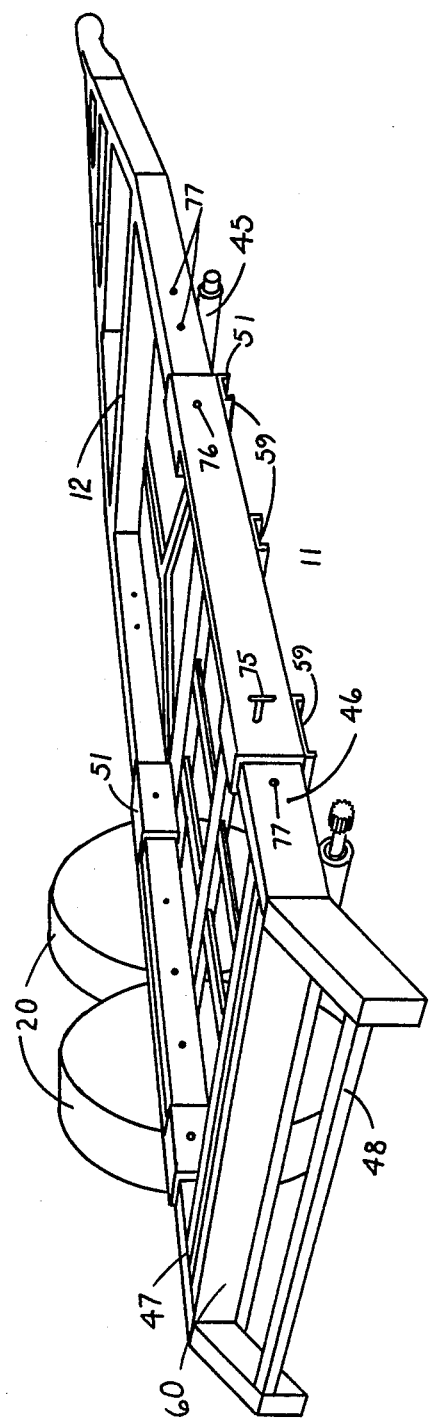
FIG. 6 is a representational perspective view of the wheel carriage assembly.

As is shown in FIGS. 1, 3 and 6, the lower perimeter frame assembly 11 if fabricated of right lower deck side rail 46 and left lower deck side rail 47 which are held in parallel relationship by front lower deck cross frame member 12, intermediate lower deck cross frame 49, front lower deck cross member 45, rear lower deck cross frame member 48 and cross member supports 60 as can be seen to advantage in FIGS. 1 and 6. All of these cross members are hung and attached to right lower deck side rail 46 and left lower deck side rail 47 to form a rigid lower deck frame assembly 11. Wherever possible these cross members are hung below lower perimeter frame side rails 46 and 47 to facilitate having the lower cargo deck as close to the ground as possible in order to reduce cargo loading problems and to lower the center of gravity for purposes of towing stability.

Referring to FIGS. 1 and 2, the upper deck perimeter frame assembly 16, and the method by which it is supported in both the raised and lowered position is shown to advantage. It can be seen that the entire upper deck assembly is supported in both the raised and lowered position by front pivot arms 22 and rear pivot arms 23.

Figure 5:
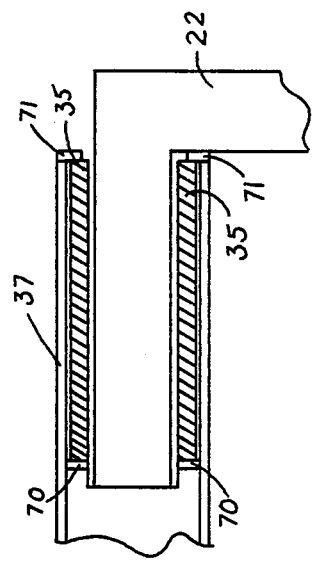
FIG. 5 is a representational view of a pivot arm hinge not incorporating the features of a torsion bar assembly.

The hinge between the upper perimeter frame assembly 16 and the pivot arms 2 and 23 is shown in FIG. 5. It should be noted that although only one hinge for front upper deck support rail 37 is shown, that all of the remaining upper deck pivot arm hinges and the nontorsionally sprung lower deck pivot arm hinges are identical. Pivot arm 22 is fabricated with a horizontal extension for insertion into front upper deck support tube 37. A positive lock, load and rotational bearing surface are provided for the hinge, in one combined assembly. First teflon bearing 35 sized for rotational engagement with the horizontal extension of pivot arm 22 is slid unto said horizontal extension. Then bearing lock ring 70 is slipped on and tac welded into place to permanently hold teflon bearing 35 in position relative to the end of the horizontal extension of pivot arm 22.

The outer diameter of teflon bearing 35 is of conforming size and shape for frictional engagement with the inside of front upper deck support tube 37. Thus, the horizontal extension of pivot arm 22, together with bearing lock ring 70 and teflon bearing 35 can be inserted into the receiving hole of front upper deck support tube 37 and held in place by frictional engagement between teflon bearing 35 and front upper deck support tube 37. To ensure permanent positioning of pivot arm 22 and teflon bearing 35, front bearing lock ring 71 is then tac welded to the butt end of upper deck support tube 37.

As is shown in FIGS. 1, 2 and 3, standard tongue hitch assembly 13 is provided and attached to the lower perimeter frame 11. Tonge hitch assembly 13 consists of front perimeter frame member 12, hitch rails 42, and hitch cross rails 43. A standard ball hitch assembly 14 and tongue jack 15 are provided for attachment of the trailer to the towing vehicle.

The carriage assembly as shown in FIGS. 3 and 6 for a pair of tandem axles is provided on a movable wheel carriage assembly constructed from wheel carriage slide rails 51 and wheel carriage cross rails 59. Wheel carriage side rails 51 are fabricated as bow rails slidable over a predetermined length of lower deck side rails 46 and 47. This movable wheel carriage assembly is an important feature of the invention since the primary intended use of my dual load trailer is for carriage of recreational vehicles and small automobiles. As a result, it is contemplated that dual load trailer 10 will be towed behind standard passenger and recreational vehicles having limited tongue and hitch weights. As a result, there is a need to adjust the location of trailer wheels 20 so as to reduce the tongue weight at hitch assembly 14 to a safe level for towing by a motor home or passenger vehicle. This creates a secondary problem in that fenders 28 and wheels 20, as shown in FIG. 1, when in a forward position, will interfere with the opening and closing of doors 19 of vehicle 18. As a result, if wheels 20 and fenders 28 have to remain in a forward position, to reduce tongue weight, then it would be impossible to load and tow vehicle 18 on my dual load trailer. Also, it is desirable, when off loading cargo from the upper deck, as is shown in FIG. 2, to move the wheel carriage assembly as far back as possible so as to better balance the trailer by keeping the center of gravity of the trailer and load between hitch 14 and wheels 20 for as long as possible when lowering the upper deck, thus minimizing the reverse, or upward unloading forces on hitch assembly 14.

FIGS. 3, 6, 7 and 8 show the means by which the wheel carriage assembly is moved forward and back. Wheel carriage extension rails 50 are attached to wheel carriage slide rails 51 and joined together to form a wheel carriage tongue and firmly attached to traveling block extension 56 which is welded to traveling block 57, and extends down through slot 58 in traveling block support cradle 52, thus forming a tongue assembly for the wheel carriage. With the ends of slot 58 defining the maximum permissible limits of travel for the wheel carriage assembly, traveling block 57 is pulled either forward or back through traveling block support cradle 52 by means of endless cable 72 which is attached to wheel carriage winch 74 and aligned by pulleys 73. Thus, the operator may move the wheel carriage forward and back merely by the operation of wheel carriage winch 74 to pull traveling block 57 either forward or back.

The wheel carriage assembly is positively locked into position by means of wheel carriage lock pins 75 which are inserted through holes 76 in slide rails 51 and locking holes 77 located in perimeter side rails 46 and 47. However, it is difficult for a single operator, operating wheel carriage winch 74 at the front of the trailer to align holes 76 and 77 when operating the winch, since said holes said cannot be seen from the front. Therefore, as an alignment aid, and additional safety feature, wheel latch bars 39, as shown in FIGS. 7 and 8, are provided together with wheel latch plugs 40 for engagement in holes 41 of traveling block top plate 44. Wheel latch bars 39 are spring loaded and controlled by linkage located convenient to the operator's station for wheel carriage winch 74. The linkage is not shown, however, it should be apparent to anyone schooled in the art that such linkage can be made and provided. Holes 41 of top plate are aligned so that when latch bar plugs 40 fall into them, there is a corresponding alignment between latch pin holes 76 and 77.

The upper deck is raised and lowered by use of winch 21 and winch cable 25 as shown in FIGS. 1 and 2. Winch cable 25 is firmly attached to the end of latch arm 26. When the upper deck is in the fully raised position, latch arm 26 is locked into position by use of latch pin assembly 29 with winch support arm 24. Winch 21 and latch arm 26 have to be stoutly supported by winch support arm 24 and latch arm braces 27.

One of the problems with most dual loan trailer designs is that it is difficult to initiate movement of the upper deck assembly when attempting to lower it. In traditional designs, the operator must stand on the tongue frame, unlatch the upper deck, slacken the winch cable and give the upper deck assembly a push to get it started. This results in strong tensional forces on winch cable 25 as the upper deck assembly and its load literally fall to the point where all of the slack is taken out of winch cable 25. This is a most intimidating maneuver for the operator and possess some hazards both from the fact that the operator has to climb unto the frame, and secondly from the possibility that winch cable 25 or its attachment point to latch arm 26 will break free.

In this present design, this problem is eliminated by the use of torsion bar biasing of the pivot arms as is shown in FIGS. 9 and 10. It should be pointed out that only one torsion bar assembly is shown in FIGS. 9 and 10. However, in the preferred embodiment at the least two rear pivot arms 23, if not all four pivot arms, are constructed with this torsion bar assembly feature. Torsion bar 62 is splined at its outer end for insertion into splined opening 61 of pivot arm 23.

Torsion bar 62 is splined at both ends, with the outer splined end sized for insertion into splined opening 61 of pivot arm 23. Torsion bar 62 functions as a horizontal extension of pivot arm 23 in much the same manner as the upper extension of pivot arm 22 as shown in FIG. 5. Again referring to FIGS. 9 and 10, it can be seen that torsion bar 62 is a load bearing transfer point for transferring the loading forces of the upper deck to teflon insert 63 which is inserted into and frictionally engages the inside diameter of load transfer tube 32. Teflon insert 63 is retained in position both by frictional engagement with load transfer tube 32 and also by back retaining ring 63 and front locking ring 65 in much the same manner as is shown and described in FIG. 5 for the upper pivot hinge.

Torsion bar 62 is held in alignment between cross rail supports 60, as is shown in FIG. 10 by torsion bar alignment bearing plate assemblies 66. The inside end of torsion bar 62 is not welded to any frame member as is normally the case, but rather has attached to its inside, splined, end, a pawl 67. This allows rear pivot arm 23 to rotate freely until pawl 67 engages either fixed stop 69 or adjustable stop 68, depending upon the direction of rotation.

In the preferred embodiment fixed stop 69 represents a permanent torsion loading of torsion bar 62 when the upper deck assembly 16 is in the fully raised and latched position. In such position, torsion bar 62 is torsionally loaded to induce a lowering motion in pivot arms when latch assemblies 29 is released. Once the lowering of upper deck assembly 16 has been commenced, and the torsional load is released from torsion bar 62, torsion bar 62 commences to rotate with pivot arm 23 until pawl 67 engages adjustable stop 68 at which time torsion bar 62 begins to incur torsional loading in the opposite direction. Adjustable stock 68 is provided so as to adjust the point at which torsional loading of torsion bar 62 begins during the lowering operation. If, for example, the upper load is a boat, as is shown in FIG. 2, and the boat is relatively heavy, it is desirable to begin torsionally loading torsion bar 62 earlier in the unloading process so as to provide maximum torsional loading when the upper deck assembly 16 is in a fully lowered position. The purpose of this is, of course, to provide maximum assist to the operator when he is attempting to reload the heavy load top upper onto perimeter deck 16. Without the torsional assist provided by the torsion bar assembly, there would be substantial tensile forces on cable 25 when attempting to raise the upper deck after a load has been placed thereon.

Figure 11:
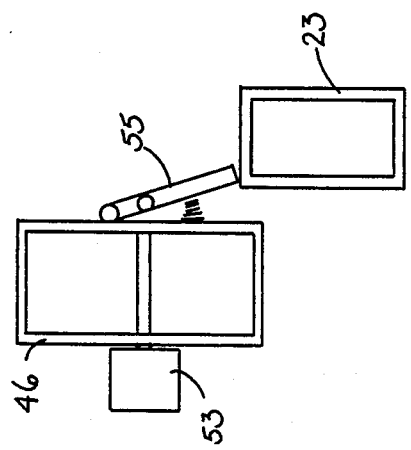
FIG. 11 is a representational end view of the pivot arm solenoid operated latch assembly.

This, however, creates yet another problem inherent to this design feature. It is highly desirable to have the upper deck under torsional load during the loading process. As previously stated, the purpose of this is to provide a torsional assist to the upper deck during the initiation of the raising process. However, there must be a means of latching the upper deck in a fully lowered position, under torsional load, in order to have the lowered deck remain in position for loading cargo, such as boat 31 shown in FIG. 2. Therefore, a solenoid operated latching mechanism is provided, as is shown in FIG. 11. Shown in FIG. 11 is lower perimeter side rail 46 and rear pivot arm 23 in a fully lowered position. In said fully lowered position, spring loaded lower latch bar 55 snaps over rear pivot arm 23 to prevent upward motion. The latch is withdrawn to an unlatched position by means of solenoid 53 which is controlled from the winch control station located near the tongue of the trailer.

For the sake of clarity in this description, certain standard features of trailers, well known in the art, have not been shown. Conventional electric trailer brake assemblies, trailer lights, license plate holders and license plate marker lights have not been shown. These are well known in the art and of conventional design.

While there is shown and described the present preferred embodiment of the invention, it is to be distinctly understood that the invention is not limited thereto but may be variously embodied to practice within the scope of the following claims.

Accordingly, what I claim is:

1. A double load highway trailer comprising:
   a lower perimeter frame generally defining a horizontal rectangle having one axis parallel to the line of travel of the trailer;
   a wheel carriage assembly slidably attached to the lower perimeter frame;
   axle means attached to the wheel carriage assembly;
   a plurality of road wheels mounted in pairs to the axle means;
   means for sliding the wheel carriage assembly forward and back relative to the lower perimeter frame;
   a plurality of pivot arms in spaced relation to each other pivotally attached to the lower perimeter frame, and each movable in a substantially vertical plane parallel to the line of travel of the trailer;
   an upper perimeter frame generally defining a horizontal rectangle, in spaced, parallel relationship with the lower perimeter frame and pivotally attached to the pivot arms;
   means for translating the upper perimeter frame as the upper side of a parallelopiped defined by the pivot arms and the lower and upper perimeter frames;
   means for progressively biasing the corners of said parallelopiped toward collapse thereof when the parallelopiped is fully extended and toward extension thereof when fully collapsed;
   a trailer tongue attached to the lower perimeter frame;
   hitch means attached to the trailer tongue.

2. The trailer of claim 1 wherein said trailer further comprises:
   adjustable height and retractable stand means for supporting the trailer tongue;
   lower cargo support means attached to the lower perimeter frame; and
   upper cargo support means attached to the upper perimeter frame.

3. The trailer of claim 1 wherein the progressive biasing means further comprises:
   a torsion bar rigidly attached at one end to a cooperating pivot arm;
   an inner tube rigidly attached to the end of the torsion bar opposite the pivot arm and to a cooperating perimeter frame member and mounted coaxially with the torsion bar; and an outer tube mounted coaxially with the inner tube and rotatably interconnected therewith and connected to a cooperating perimeter frame member.

4. The trailer of claim 1 wherein the upper and lower cargo support means further comprise spatially adjustable, detachable, and interchangeable cargo support means.

5. The trailer of claim 1 wherein the translating means further comrpises:
   winch means rigidly attached to the lower perimeter frame; and
   a winch cable interconnecting the winch means and the upper perimeter frame.

6. The trailer of claim 1 wherein the road wheels are four in number and are mounted in tandem.

7. The trailer of claim 1 wherein an automobile may be carried on the lower cargo support means when the parallelopiped is substantially fully extended.

8. The trailer of claim 1 wherein the upper support means is specially adapted to support and launch a boat.

* * * * *